United States Patent
Schmidt et al.

(10) Patent No.: US 7,075,626 B2
(45) Date of Patent: Jul. 11, 2006

(54) LASER DISTANCE MEASURING DEVICE

(75) Inventors: Dierk Schmidt, Leinfelden-Echterdingen (DE); Joerg Stierle, Waldenbuch (DE); Peter Wolf, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 10/470,429

(22) PCT Filed: Dec. 5, 2002

(86) PCT No.: PCT/DE02/04460

§ 371 (c)(1),
(2), (4) Date: Nov. 26, 2003

(87) PCT Pub. No.: WO03/050564

PCT Pub. Date: Jun. 19, 2003

(65) Prior Publication Data

US 2004/0070747 A1    Apr. 15, 2004

(30) Foreign Application Priority Data

Dec. 8, 2001    (DE) ................................ 101 60 439

(51) Int. Cl.
*G01C 3/08*    (2006.01)
*G01C 3/00*    (2006.01)

(52) U.S. Cl. .................. 356/5.09; 356/5.11; 356/5.12; 356/5.15

(58) Field of Classification Search ............... 356/3.01, 356/3, 6, 3.1, 5.11, 5.1, 5.09; 331/2, 46, 331/51; 375/306, 320
See application file for complete search history.

(56) References Cited

U.S. PATENT DOCUMENTS

| | | | | |
|---|---|---|---|---|
| 3,644,831 A | * | 2/1972 | Latker et al. | ............... 455/109 |
| 3,713,155 A | * | 1/1973 | Jaffe | ........................... 342/92 |
| 3,733,129 A | * | 5/1973 | Bridges | ..................... 356/5.09 |
| 3,778,159 A | * | 12/1973 | Hines et al. | ............... 356/5.11 |
| 4,310,920 A | * | 1/1982 | Hayes | ........................ 370/204 |
| 5,082,364 A | * | 1/1992 | Russell | ..................... 356/5.15 |
| 5,152,005 A | * | 9/1992 | Bickley | ........................ 455/76 |
| 5,204,642 A | * | 4/1993 | Asghar et al. | .............. 331/135 |
| 5,400,130 A | | 3/1995 | Tsujimoto | |
| 5,920,840 A | * | 7/1999 | Satyamurti et al. | ......... 704/267 |
| 6,147,763 A | | 11/2000 | Steinlechner | |

FOREIGN PATENT DOCUMENTS

| WO | 00/33104 | 6/2000 |
|---|---|---|
| WO | 00 33104 A | 6/2000 |

* cited by examiner

*Primary Examiner*—Thomas H. Tarcza
*Assistant Examiner*—Luke Ratcliffe
(74) *Attorney, Agent, or Firm*—Michael J. Striker

(57) ABSTRACT

The invention is based on a laser range finder that has a transmitter unit (10) with at least one laser, a receiver unit (12), and a single sideband modulation unit (14) that can use a first single sideband modulation frequency (ZF1) generated by an oscillator unit (16) and a carrier frequency (T1) to generate a modulation frequency (S1) of the transmitter unit (10).

According to the invention, the oscillator unit (16) can generate at least one additional frequency (ZF2) and the single sideband modulation unit (14) can use the additional frequency (ZF2) to generate a demodulation frequency (S2) of the receiver unit (12).

8 Claims, 3 Drawing Sheets

LASER DISTANCE MEASURING DEVICE

BACKGROUND OF THE INVENTION

The present invention relates to a laser range finder.

There are known laser range finders, which have a transmitter unit with a laser, a receiver unit, and a single sideband modulation unit. In these laser range finders, the single sideband modulation unit can use a single sideband modulation frequency generated by an oscillator unit, which simultaneously corresponds to a low frequency or a useful signal for phase determination, and a carrier frequency to generate a modulation frequency of the transmitter unit.

The original carrier frequency is used as a demodulation frequency of the receiver unit.

SUMMARY OF THE INVENTION

The invention is based on a laser range finder that has a transmitter unit with at least one laser, a receiver unit, and a single sideband modulation unit that can use a first single sideband modulation frequency generated by an oscillator unit and a carrier frequency to generate a modulation frequency of the transmitter unit.

According to the invention, the oscillator unit can generate at least one additional frequency and the single sideband modulation unit can use the additional frequency to generate a demodulation frequency of the receiver unit. A distance between the carrier frequency, the modulation frequency, and the demodulation frequency can be selected independent of a useful signal; in particular, this distance can be selected to be greater than the useful signal. Disturbance variables can be easily eliminated or filtered out, particularly if the oscillator unit can generate at least one second single sideband modulation frequency, and the single sideband modulation unit can use the second single sideband modulation frequency to generate a demodulation frequency of the receiver unit. An inexpensive laser range finder can achieve high-precision measuring results. In lieu of using a second single sideband modulation frequency, it is also possible to generate the demodulation frequency using a second carrier frequency.

If the oscillator unit has a single high-precision oscillator that can generate at least the two single sideband modulation frequencies and/or if the oscillator unit is coupled to at least two dividers with different factors that can be used to generate the single sideband modulation frequencies, then this makes it possible to produce especially compact, inexpensive, and lightweight laser range finders.

If the oscillator unit has at least one LF generator or low frequency generator and if at least one single sideband modulation frequency can be generated by means of a synthetic frequency shifting, then a high degree of flexibility can be achieved in the frequency generation.

In another embodiment according to the invention, the oscillator unit has a PLL unit or phase-locked loop unit for generating the carrier frequency, which allows this frequency to be generated with an inexpensive circuit. However, it is also possible that an oscillator unit with at least two PLL units can be used to generate at least two carrier frequencies.

In another embodiment according to the invention, the oscillator unit and the single sideband modulation unit can generate a sinusoidal signal. However, other signal forms deemed useful by one skilled in the art are also conceivable. Sinusoidal signals, though, allow the number of filters to be easily reduced or completely eliminated. This allows savings in additional components, space, weight, assembly difficulty, and costs.

Although the embodiment according to the invention is in fact suitable for all laser range finders deemed appropriate by one skilled in the art, it is particularly suitable for handheld laser range finders, which the embodiment according to the invention permits to be designed not only with a high degree of measuring precision, but also in a reasonably priced, compact form.

Other advantages ensue from the following description of the drawings. The drawings show an exemplary embodiment of the invention. The drawings, the specification, and the claims contain numerous features in combination. One skilled in the art will also suitably consider the features individually and unite them into other meaningful combinations.

DESCRIPTION OF THE PREFERRED EMBODIMENT

Figure 1:
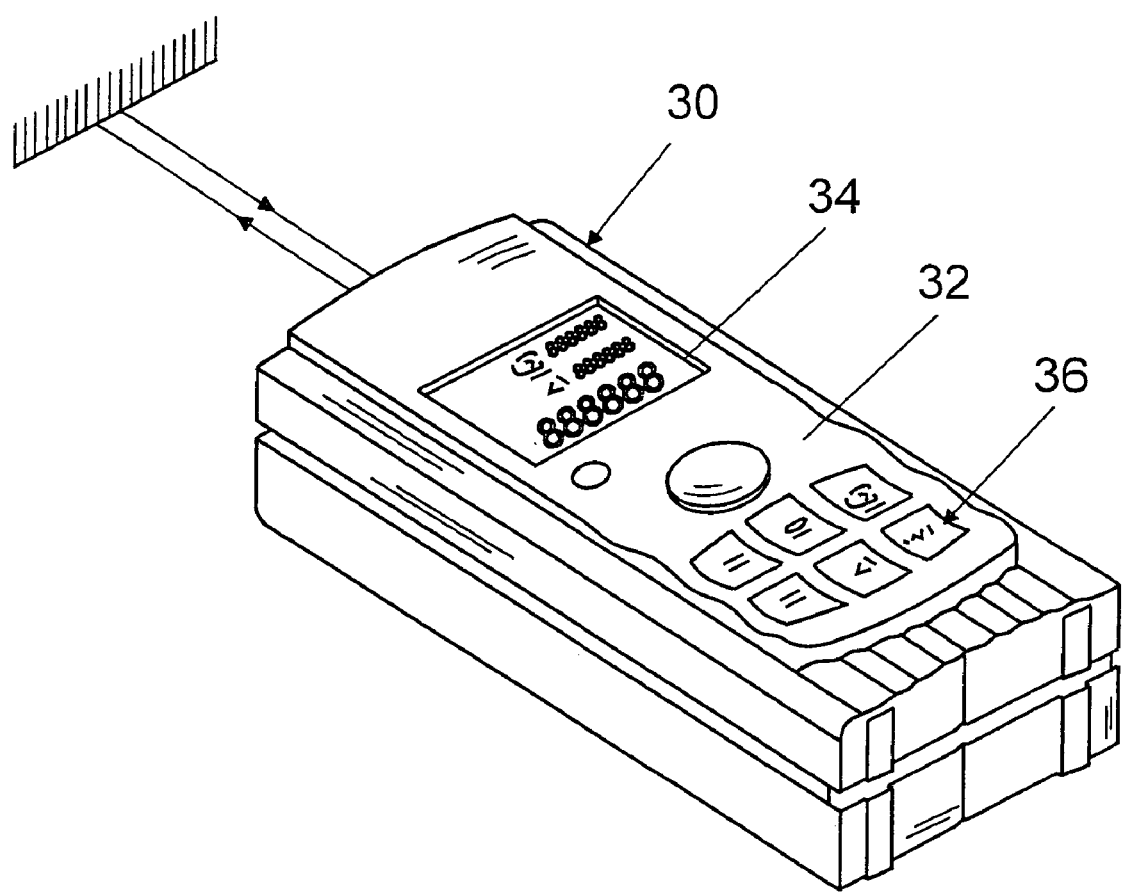
FIG. 1 shows a handheld laser range finder in a three-quarter view from above.
Figure 2:
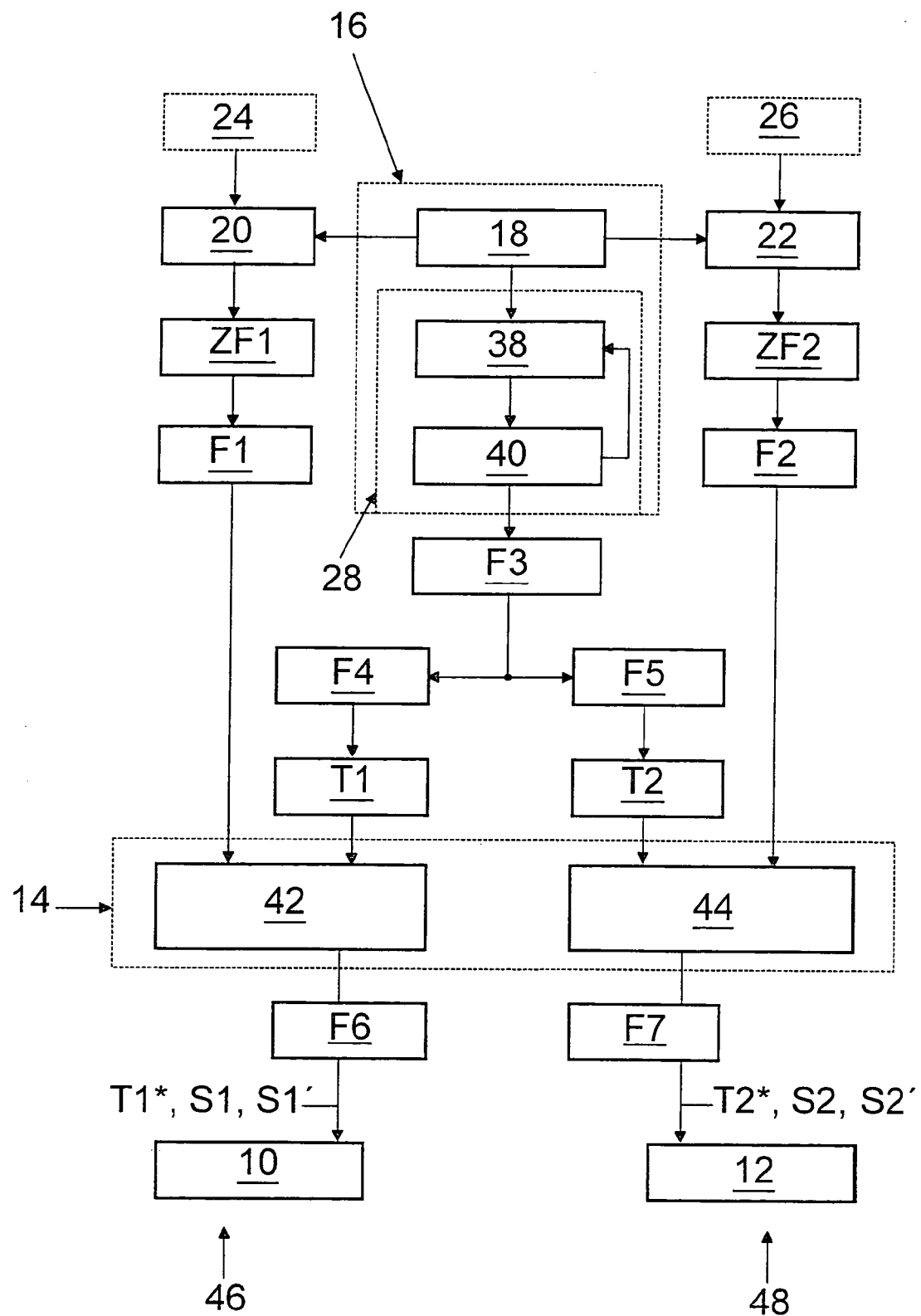
FIG. 2 shows a schematically depicted circuit design of the laser range finder from FIG. 1.

FIG. 1 shows a laser range finder with a transmitter unit 10 for transmitting a laser measurement signal disposed in the housing 30 (FIGS. 1 and 2). The transmitter unit 10 has a laser diode, not shown, and a collimation lens, which can be used to direct the measurement signal in a bundled form through an outlet conduit.

The laser range finder also has a receiver unit 12 with a lens, not shown, which captures measurement signal components reflected against an object and directs them to an optoelectronic converter. The converter, which is preferably embodied as an avalanche photodiode, receives the measurement signal components and conveys them in electrical form to a computing unit or evaluation unit that is likewise not shown.

The top 32 of the laser range finder is provided with a display unit 34 and a number of push buttons 36 (FIG. 1).

Figure 3:
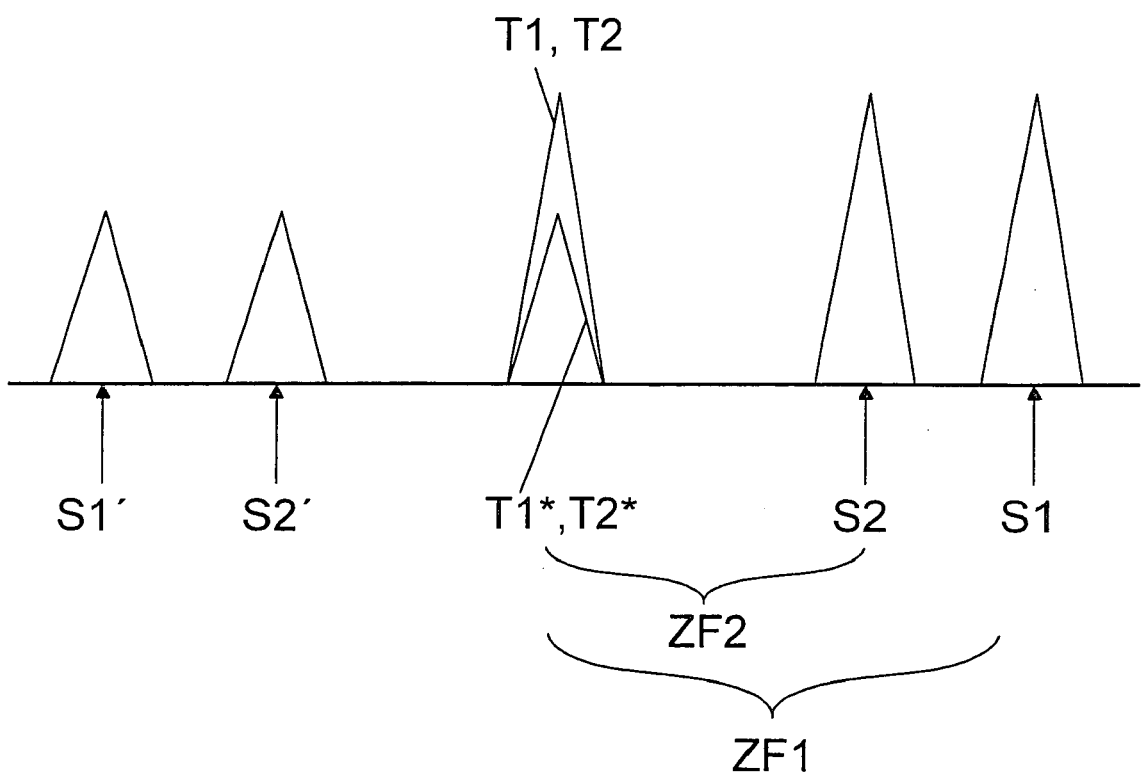
FIG. 3 shows a schematic depiction of a spectrum of the laser range finder from FIG. 1.

The laser range finder also has a single sideband modulation frequency unit 14 that can use a single sideband modulation frequency ZF1 generated by an oscillator unit 16 and a carrier frequency T1 to generate a modulation frequency S1 of the transmitter unit 10 (FIGS. 2 and 3).

According to the invention, the oscillator unit 16 can generate a second single sideband modulation frequency ZF2; the single sideband modulation unit 14 can use the second single sideband modulation frequency ZF2 to generate a demodulation frequency S2 of the receiver unit 12.

The oscillator unit 16 has a single high-precision oscillator 18 that can generate the single sideband modulation frequencies ZF1, ZF2 by means of two dividers 20, 22 with different factors that are coupled to the oscillator unit 16. The single sideband modulation frequency ZF1 and/or ZF2 could, however, also be synthetically generated by means of an LF generator 24, 26, as indicated in FIG. 2. In this connection, the dividers 20, 22 can be provided with the same factor.

In addition, the high-precision oscillator 18 can also generate the carrier frequency T1 for the transmitter unit 10 and a carrier frequency T2 for the receiver unit 12, in fact by means of a PLL unit 28 of the oscillator unit 16, which has a PLL block 38 or phase-locked loop block and a VCO block 40 or voltage-controlled oscillator block. The carrier frequencies T1, T2, however, could also be generated by separate oscillators.

The single sideband modulation unit 14, which has a first single sideband modulator 42 for the transmitter unit 10 and a second single sideband modulator 44 for the receiver unit 12, is preceded by filters F1, F2 in the path 46 of the transmitter unit 10 and in the path 48 of the receiver unit 12 in order to filter out undesired frequencies from the single sideband modulation frequencies ZF1, ZF2, which can also be referred to as intermediate frequencies. The oscillator unit 16 is followed by three filters F3, F4, F5, a central filter F3 immediately after the VCO block 40, and a respective filter F4 and F5 for the path 46 of the transmitter unit 10 and the path 48 of the receiver unit 12. In addition, after the single sideband modulation unit 14, the transmitter unit 10 and the receiver unit 12 are each preceded by a filter F6, F7.

Fundamentally, the paths 46, 48 for the transmitter unit 10 and the receiver unit 12 could also be exchanged and the frequency S2 could be used for modulating the transmitter unit 10 and the frequency S1 could be used for demodulating the receiver unit 12.

It would also be possible for the oscillator unit 16 and the single sideband modulation unit 14 to generate a sinusoidal signal, which would permit the filters F1–F5 to be simply omitted. Other signal forms can require filters of different designs and combinations deemed appropriate by one skilled in the art, particularly in the paths 46, 48 of the transmitter unit 10 and the receiver unit 12. The filters F1–F5 serve in particular to achieve a particular measuring precision and to limit the bandwidth.

The single sideband modulator 42 of the single sideband modulation unit 14 shifts the carrier frequency T1 with the single sideband modulation frequency ZF1, which produces the modulation frequency S1 of the transmitter unit 10 and the frequency S1' or the sidebands S1 and S1' as well as the carrier frequency T1*. The single sideband modulator 44 of the single sideband modulation unit 14 shifts the carrier frequency T2 with the single sideband modulation frequency ZF2, which produces the demodulation frequency S2 of the receiver unit 12, the frequency S2' or the side bands S2 and S2' as well as the carrier frequency T1*. The carrier frequencies T1, T2 have a greater amplitude than the carrier frequencies T1*, T2*; otherwise the carrier frequencies T1, T2, Ti*, T2* are identical. The elimination of the filters F3 to F5, which is possible with an appropriate choice of the signal form, would cause the carrier frequencies T1 and T2 to coincide.

The suppressed frequencies S1', S2' or the suppressed sidebands are approximately 40 dB lower than the modulation frequency S1 of the transmitter unit 10 and the demodulation frequency S2 of the receiver unit 12. The suppressed carrier frequencies T1*, T2* are also typically approx. 40 dB lower than the modulation frequency S1 of the transmitter unit 10 and the demodulation frequency S2 of the receiver unit 12.

In the demodulation, all of the frequencies T1*, S1, S1' of the first path 46 of the transmitter unit 10 are mixed with all of the frequencies T2*, S2, S2' of the path 48 of the receiver unit 12. Disturbance vectors generated as a result of this are significantly smaller than in conventional systems (S1' *S2'- approx. 80 dB) or are far enough removed in terms of frequency from an LF useful signal, which is produced from a difference between the signals of the first path 46 of the transmitter unit 10 and the path 48 of the receiver unit 12 (in the ratio of intermediate frequency to LF useful signal) that they can be filtered out with no trouble. In particular, with an appropriate choice of the single sideband modulation frequencies ZF1, ZF2, the vectors that are produced by multiplying the frequency S1' by the carrier frequency T2* and by multiplying the frequency S2' by the carrier frequency T1* lie far above the frequency of the LF useful signal, which is produced by mixing the modulation frequency S1 and the demodulation frequency S2 and in this exemplary embodiment, lies at about 4 kHz.

The invention claimed is:

1. A laser range finder that has a transmitter unit (10) with at least one laser, a receiver unit (12), and a single side-band modulation unit (14) that can use a first single sideband modulation frequency (ZF1) generated by an oscillator unit (16) and a carrier frequency (T1) to generate a modulation frequency (S1) of the transmitter unit (10) as it shifts the carrier frequency (T1) with the single sideband modulation frequency (ZF1), characterized in that the oscillator unit (16) can generate at least one additional single sideband modulation frequency (ZF2) and the single sideband modulation frequency (ZF2) and the single sideband modulation unit (14) can use the additional single sideband modulation frequency (ZF2) and a carrier frequency (T2) to generate a demodulation frequency (S2) of the receiver unit (12) as it shifts the carrier frequency (T2) with the single sideband modulation frequency (ZF2).

2. The laser range finder according to claim 1, characterized in that the oscillator unit (16) can generate at leas tone second single sideband modulation frequency (ZF2), and the single sideband modulation unit (14) can use the second single sideband modulation frequency (ZF2) to generate a demodulation frequency (S2) of the receiver unit (12).

3. The laser range finder according to claim 2, characterized in that the oscillator unit (16) has a single high-precision oscillator (18) that can generate at least the two single sideband modulation frequencies (ZF1–ZF2).

4. The laser range finder according to claim 2, characterized in that the oscillator unit (16) is coupled to two dividers (20, 22) with different factors that can be used to generate the single sideband modulation frequencies (ZF1,ZF2).

5. The laser range finder according to claim 2, characterized in that the oscillator unit (16) has at least one LF generator (24, 26) and at least one single sideband modulation frequency (ZF1,ZF2) can be generated by means of a synthetic frequency shifting.

6. The laser range finder according to claim 1, characterized in that the oscillator unit (16) has a PLL unit (28) for generating the carrier frequency (T1,T2).

7. The laser range finder according to claim 1, characterized in that the oscillator unit (16) and the single sideband modulation unit (14) can generate a sinusoidal signal.

8. A method for signal generation of a laser range finder that has a transmitter unit (10) and a receiver unit (12), and in which a single sideband modulation unit (14) uses a first single sideband modulation frequency (ZF1) generated by an oscillator unit (16) and a carrier frequency (T1) to generate a modulation frequency (S1) of the transmitter unit (10) as it shifts the carrier frequency (T1) with the single sideband modulation frequency (ZF1), characterized in that the oscillator unit (16) generates at least one additional single sideband modulation frequency (ZF2) and the single sideband modulation unit (14) uses the additional single sideband modulation frequency (ZF2) and a carrier frequency (T2) to generate a demodulation frequency (S2) of the receiver unit (12) as it shifts the carrier frequency (T2) with the single sideband modulation frequency (ZF2).

* * * * *